United States Patent [19]
Ringkamp

[11] 3,796,448
[45] Mar. 12, 1974

[54] QUICK ACTING CONNECTOR FOR TELESCOPICALLY JOINED PIPE ENDS AND THE LIKE

[75] Inventor: Joseph D. Ringkamp, Clarks Summit, Pa.

[73] Assignee: Acker Drill Company, Inc., Clarks Summit, Pa.

[22] Filed: Sept. 15, 1972

[21] Appl. No.: 289,721

[52] U.S. Cl................. 285/317, 175/323, 285/330, 285/404, 339/254
[51] Int. Cl............................................. F16l 39/00
[58] Field of Search ....... 285/317, 305, 8, 336, 314, 285/315, 316, 38, 39, 91, 404; 339/253, 254; 175/323

[56] References Cited
UNITED STATES PATENTS
1,037,072   8/1912   Snyder........................... 285/305 X
2,431,268  11/1947   McIntyre ......................... 285/317
3,190,377   6/1965   Rassieur........................ 285/404 X FOREIGN PATENTS OR APPLICATIONS
460,786   2/1937   Great Britain..................... 285/305

Primary Examiner—Dave W. Arola
Attorney, Agent, or Firm—Jones & Lockwood

[57] ABSTRACT

A quick connect and release locking device for telescopically joined together tubular sections or telescopically joined together tubular auger socket and tubular auger shank ends is provided. Spring pressed pins mounted in the wall of the socket extend into recesses in the tubular wall of the auger shank. Cam surfaces on the inner ends of the spring pressed pins moved by the end of the shank cause the pins to move outwardly thereby allowing the telescoping together of the socket and shank until the recesses in the shank wall receive the inner ends of the pins. The outer ends of the spring pressed pins have a reduced neck portion. The pins may be moved out by prying with a screw driver or a claw hammer. A special tool is also provided that has arms with bifurcated ends that fit over the reduced neck portions of the pins to move the pins radially outward against their springs. The operating tool has a main body with a circular-like recess at its center and oppositely disposed radially extending bores that receive plungers attached to the arms that are held together by a spring. A circular-like plate is received in the recess and it has cam surfaces that move the pins out and likewise permit them to move in. An axial shaft mounts the circular plate to the main body and an operating handle is attached to the axial shaft. Suitable slots are provided in the main body that receive and guide pins extending transversely through the plungers that hold the plungers in their bores.

7 Claims, 7 Drawing Figures

QUICK ACTING CONNECTOR FOR TELESCOPICALLY JOINED PIPE ENDS AND THE LIKE

SUMMARY OF THE INVENTION

Heretofore tubular socket and shank sections of pipe and auger sections have been detachably secured together, besides a clutch joint drive in auger sections, by a set screw, keys or loose external parts. In most of such connectors except the threaded type there is some through hole or slot leading into the hollow inner space so that fluid or grout which is pumped under pressure can push out through the joint. The object of this invention is to overcome these disadvantages. There is provided a replaceable cap with pin assembly or socket assembly mounted in a transverse bore through the wall of the outer tubular member and having its pin spring biased to snap into a non-through recess in the wall of the inner tubular member of shank being received in the outer or tubular socket end of the auger or tube. There is no fluid leakage in this locking assembly. To further insure no leakage an O-ring is carried by the socket or outer tubular member in an annular recess in the inner wall thereof proximal to and inboard of the cap and pin assembly in the wall of the socket or outer tubular member. This O-ring forms a seal in its recess and with the adjacent surface of the shank or inner member.

Other objects and advantages of the invention will become apparent upon reading the attached detailed description, and upon reference to the drawings, which:

FIG. 1 is a perspective view of an assembled auger socket and shank having the quick acting connectors or lock assemblies and and actuating tool in place to unlock the connectors;

FIG. 2 an end view of the handle actuating end of the tool partially in section showing an actuating plunger for one of the actuating arms;

Throughout the description which follows like reference numbers refer to like parts in the various Figures.

Figure 1:
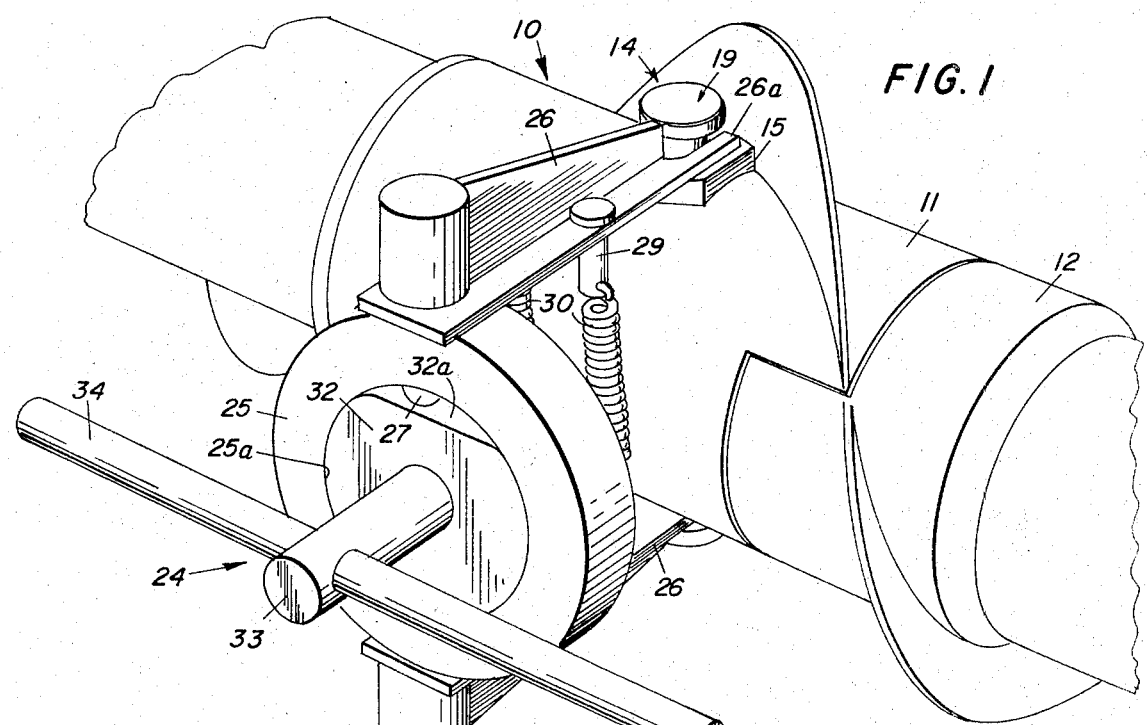
Figure 2:
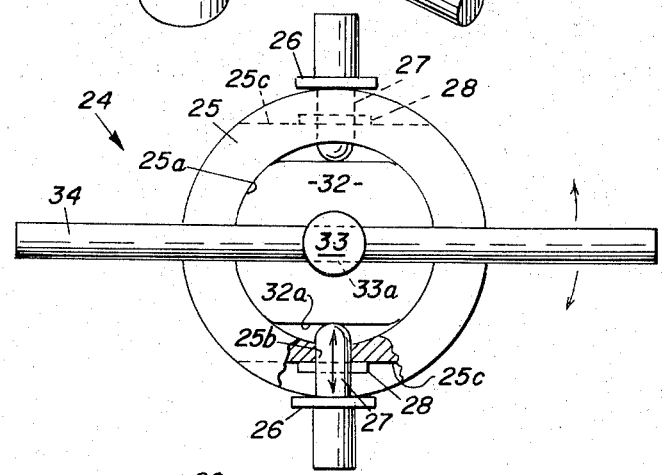
Figure 3:
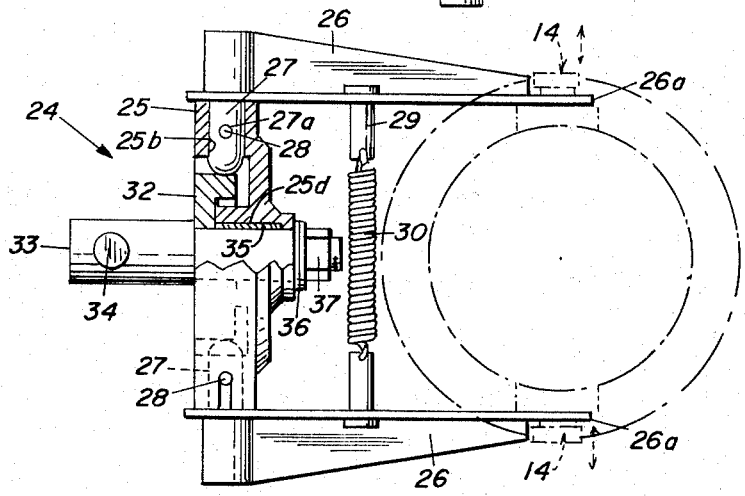
FIG. 3 is a side view of the tool partially in section showing the cam actuations of one of the plungers attached to an arm shown lifting one of the locking assemblies.
Figure 4:
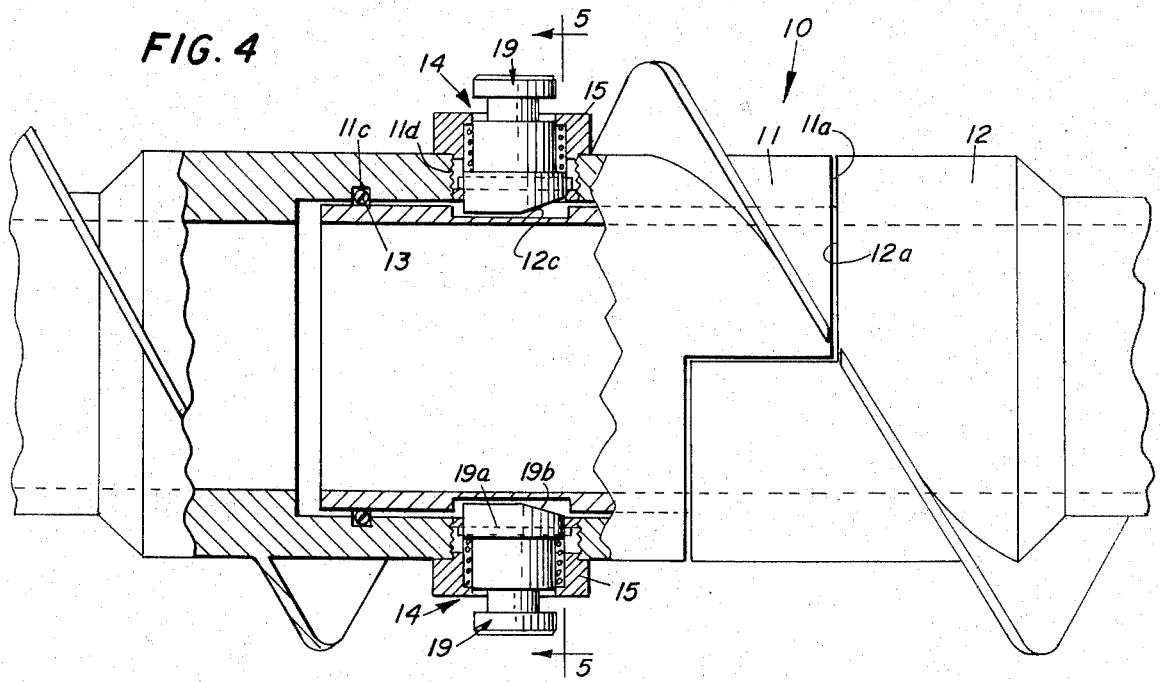
FIG. 4 is a side elevation of the socket and shank connection partially in section showing the connectors or locking assemblies.
Figure 5:
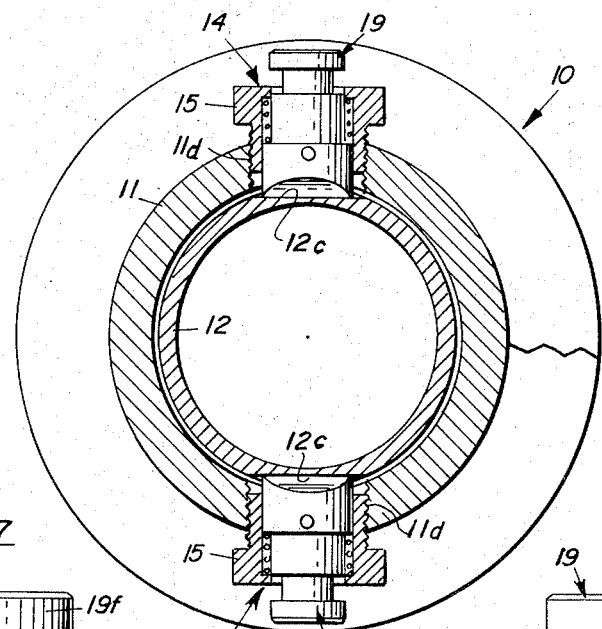
FIG. 5 is a cross sectional view of the locking assemblies on line 5—5 of FIG. 4.
Figure 6:
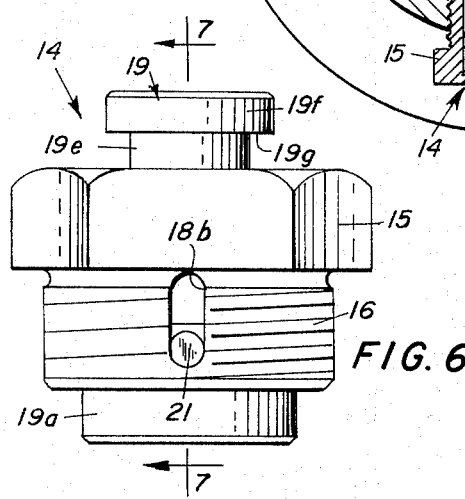
FIG. 6 is a side elevation of one of the lock assemblies on an enlarged scale showing the cap and pin members.
Figure 7:
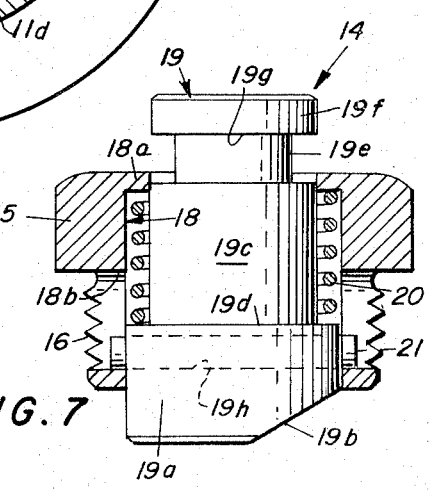
FIG. 7 is a cross sectional view of the lock assembly in FIG. 6 taken on line 7—7 of FIG. 6.

At 10 in FIG. 1 is an assembly of a socket end 11 and a shank end 12 of a hollow stem auger. The socket 11 has a driven clutch portion 11a meshing with the driving clutch portion 12a on the shank section. In the annular recess 11c in the inside face of socket 11 is seated an O-ring seal 13, between the two sections. There are two oppositely positioned internally threaded bores 12d through the wall of the socket end to receive quick connector assemblies to be described.

The shank end 12 has a tubular main body portion 12b and in this are formed oppositely positioned recesses that are in line with the bores 12d when the shank end is slid into position in the socket end. These serve to receive a locking pin of the quick acting connector or lock assembly 14 to be described.

The quick acting connector or lock assembly 14 has a cap member 15 that has an externally threaded annular body portion 16 threadedly received in the internally threaded bore 11d. There is a hexagonial wrench receiving portion 16 on the cap member. On the inside of the cap is a cylindrical spring receiving recess or pocket 18 which has a shoulder surface 18a at its outer end. In the inner end portion in the area of the externally threading on the cap are oppositely disposed axially extending slots 18b.

An elongated cylindrical-like pin 19 is received in the annular cap member 15. It has an inner end portion 19a which has a tapered end surface 19b. Next to the end portion 19a the pin has a reduced spring receiving cylindrical portion 19c which receives thereon a cylindrical compression spring 20. A shoulder 19d is formed between the reduced portion 19c and the adjacent inner end 19a against which the inner end of spring 20 rests. The outer end of spring 20 seats against the shoulder 18a at the outer end of the cap 15. Pin 19 has a protruding outer end projecting through the outer end of the cap 15 and this outer end has a reduced neck portion 19e next to the terminal outer end 19f. A shoulder 19g is thereby formed between the neck 19e and the terminal end 19f. It is against this shoulder that a prying force is applied as by screw driver, claw hammer or special tool to be described to pull the pin 19 out against the spring 20. The pin 19 has a transversely extending bore 19h in its inner end which received a securing pin 21 whose ends project in the elongated axially extending slots 18b in the annular body portion 16 of the cap 15. This pin 19h traveling in the elongated slots 18b holds the pin 19 in an oriented position so that when the lock assembly 14 is installed in the threaded bore 19d of the wall of the socket end 11 the end of the shank tubular main portion 12b will ride against the tapered end surface 19b to move pin 19 outward and permit shank end 12b to be telescopically received in socket end 11. The end portion 19a of the pin will snap into the recess 12c in the outer surface of tubular main portion 12b of shank end 12. Since the recess or pocket 12c has a bottom and does not extend fully through the main body wall 12b together with the O-ring seal 13 between the telescoped ends of socket 11 and shank 12, there is no leakage of fluid in or out of the hollow stem auger at the coupling joint.

Two oppositely disposed connectors or lock assemblies 14 are installed on the socket end 11.

A special tool 24 is provided to operate the quick acting connectors 14 to unlock them by simultaneously pulling outwardly their locking pins 19 from their projection in the recesses or pockets 12c in the wall 12b of the shank end 12.

This operating tool generally indicated at 24 has a circular shaped main body member 25 having a circular shaped recess 25a therein formed by an annular portion. In the wall of the annular portion there are oppositely disposed radially extending bores 25b communicating with tangential slots 25c formed in the outer adjacent annular portion. There is a central axially extending bore 25d in the main body member.

A pair of arms 26 are provided which have at one end bifurcated portions 26a that are slipped over the reduced neck portion 19c of the pins 19 to apply a lifting or pulling force. The other ends of the arms 26 have attached a transversely extending plunger which are received in the radially extending bores, 25b in the main body members. The plungers have a transverse pin receiving bore 27a therein that receives a securing pin 28 which has projecting ends riding in the slot 25c in the main body.

The two arms are biased towards each other by a tension spring 30 secured at each end to a pin 29 mounted in an aperture in each arm 26.

A circular shaped plate 32 is received in the circular shaped recess 25a of the main body 25 and it has oppositely disposed tangentially extending cam surfaces 32a thereon against which the inner ends of the plunger 27 bear. Thus as the circular plate is rotated the plungers are moved out and so also the arms to lift the pins 19 from the locking recesses or pockets 12c. There is an axially extending operating shaft 33 that is affixed to the center of the circular-shaped plate 32 and it is rotatably received in a sleeve bearing 35 mounted in a central bore 25d in the main body 25. A washer 36 is received over the end of shaft 33 and the end of shaft 33 which is threaded there is received a securing nut 37. The outer end of shaft 33 has a transverse bore 33a that receives an operating handle or bar 34.

In operation the shank end 12 of the tubular hollow stem is received in the pocket end 11 of the adjacent hollow stem. As the end of the shank main tubular portion 12c rides against the tapered surface 19b of pin 19 it forces the pin outwardly. As the recess 12c lines up with the pin, the pin is forced inwardly under the influences of the spring 20 and the inner end of the pin at 19a seats in the recess 12c locking the two sections together. To unlock the juncture, the pins may be pried outward by a screw driver or claw hammer inserted at the neck portion 19c under the enlarged end 19f of the pin 19. The special tool 24, as described above, may be used to simultaneous lift the two pins 19.

What is claimed is:

1. A locking apparatus in combination with a first and second tublar member for detachably securing together said first and second tubular members, said first tubular member telescopically receiving therein the end of said second tubular member, said first tubular member having a transverse bore through its wall, said second tubular member having a recess portion extending in from a peripheral face portion and in alignment with said transverse bore, an annular cap member received in said transverse bore through the wall of said first tubular member, and having a cylindrical spring pocket recess extending from a shoulder at its outer end to the inner end of the cap and oppositely disposed elongated axially extending slots in the wall of said cap member, a pin member received in said annular cap member and having an inner end portion with a tapered end face and a securing pin receiving bore extending through a diameter thereof, a reduced in diameter spring receiving portion adjacent the inner end portion and forming a shoulder therewith and an outer protruding end with a reduced neck portion joining the spring receiving portion whereby there is an enlarged outer end and shoulder portion formed between it and the reduced neck portion, an elongated compression spring received over the spring receiving portion of the pin and seating against said shoulder and received in the spring pocket recess of the annular cap as the pin is pushed into the cap from its inner end to compress said spring, as its outer end seats against said shoulder in the cap, a securing pin receiving in said elongated slots in the cap and in said securing pin bore with its ends protruding in said axially extending elongated slots in the cap, said tapered end face portion on the inner end of the pin riding against the end of the second tubular member as the second tubular member is telescopically inserted into the end of the first tubular member thereby moving the pin radially outward and compressing said spring until the spring pressed pin is received in the recess portion of the second tubular member thereby locking said two tubular members together, said reduced neck and shoulder portions at the protruding outer end of the pin being adapted to receive a pulling force to unseat said pin from said recess whereby the tubular members may be slid apart.

2. The locking apparatus according to claim 1 wherein the annular cap is externally threaded for threadedly being received in a threaded bore of the first tubular member.

3. In combination with two auger sections each having a tubular shaft and a socket end and a shank end, said socket end having a transverse bore through its wall, said shank end on one section having a recessed portion extending in from a peripheral face portion and in alignment with said transverse bore in the socket end of a section assembled to said shank end section, said socket and shank ends having a cooperating drive means, an annular cap member received in said transverse bore through the wall of said socket end and having a cylindrical spring pocket recess extending from a shoulder portion at its outer end to the inner end of the cap and oppositely disposed elongated axially extending slots in the wall of said cap member, a pin member received in said annular cap member and having an inner end portion with a tapered end face and a securing pin receiving bore extending through a diameter thereof, a reduced in diameter spring receiving portion adjacent the inner end portion and forming a shoulder therewith and an outer end protruding out beyond said cap and having means thereon for applying a pulling force to retract same against said spring, an elongated compression spring received over the spring receiving portion of each pin and seating against said shoulder at one end and received in the spring pocket recess of the annular cap as the pin is pushed through the inner end of the cap to compress said spring as its outer end seats against said shoulder in the cap, and a securing pin received in said elongated slots in the cap and in said securing pin bore with its ends protruding in said axially extending elongated slots in the cap, said tapered end face portion on the inner end of the pin riding against the end of the shank end as the shank end is telescopically received in the socket end thereby moving the pin radially outward and compressing said spring until the spring pressed pin is received in the recess portion of the socket end thereby locking said two auger sections together, said outer end of the pin receiving a pulling force to retract said pin to allow the two auger sections to be pulled apart.

4. The apparatus of claim 3 wherein said socket end of the tubular shaft has two oppositely disposed transverse bores and each has an annular cap member with a pin member, spring and securing pin therein and wherein each outer protruding end of pin has a reduced neck portion thereby leaving an enlarged outer end with a shoulder portion, said reduced neck and shoulder portions serving as the means thereon for applying a pulling force to retract the pin thereby allowing the two auger sections to be pulled apart.

5. The apparatus of claim 4 wherein the oppositely disposed transversely extending bores in the pocket end of the tubular shaft are threaded and the annular cap members have external threads whereby the caps are threadedly received in said threaded bores.

6. The apparatus of claim 3 including O-ring seal means positioned between said socket and adjacent said shank end received therein.

7. The apparatus of claim 3 wherein said socket end has an annular recess in its inner wall positioned between the inner end of said socket and said transverse bore through its wall and an O-ring seal received in said annular recess and forming a seal with the shank end received in said socket end.

* * * * *